United States Patent
Aiso

(10) Patent No.: US 8,086,063 B2
(45) Date of Patent: Dec. 27, 2011

(54) IMAGE DISPLAY APPARATUS AND METHOD, AND PROGRAM

(75) Inventor: Seiji Aiso, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 905 days.

(21) Appl. No.: 12/115,405

(22) Filed: May 5, 2008

(65) Prior Publication Data

US 2009/0046942 A1 Feb. 19, 2009

(30) Foreign Application Priority Data

Jul. 17, 2007 (JP) ................................. 2007-185311

(51) Int. Cl.
  *G06K 9/40* (2006.01)
  *G06K 9/48* (2006.01)
  *G03B 13/00* (2006.01)
  *H04N 5/228* (2006.01)
(52) U.S. Cl. ...... 382/261; 382/199; 348/345; 348/222.1
(58) Field of Classification Search .................. 382/261, 382/199; 348/345, 222.1
  See application file for complete search history.

(56) References Cited

U.S. PATENT DOCUMENTS

| | | | |
|---|---|---|---|
| 4,804,831 A * | 2/1989 | Baba et al. | 250/201.2 |
| 5,212,516 A * | 5/1993 | Yamada et al. | 348/354 |
| 5,604,538 A * | 2/1997 | Kaneda et al. | 348/353 |
| 6,118,484 A * | 9/2000 | Yokota et al. | 348/350 |
| 6,757,427 B1 * | 6/2004 | Hongu | 382/164 |
| 2005/0243351 A1 * | 11/2005 | Aoyama | 358/1.9 |
| 2006/0078218 A1 * | 4/2006 | Igarashi | 382/255 |
| 2007/0196027 A1 * | 8/2007 | Lin et al. | 382/254 |
| 2008/0309777 A1 * | 12/2008 | Aoyama | 348/222.1 |

FOREIGN PATENT DOCUMENTS

JP 2006-019874 1/2006

* cited by examiner

*Primary Examiner* — Wengpeng Chen
(74) *Attorney, Agent, or Firm* — DLA Piper LLP (US)

(57) ABSTRACT

An image display apparatus, that displays a digital image on a screen for check use, includes: an image data storage unit that stores image data of the digital image; an edge detection unit that detects an edge included in the digital image through analysis of the image data; and an image display unit that displays, when the edge being a detection result has a width wider than a predetermined first threshold width, the digital image in a state that the width of the edge is visible on the check screen.

6 Claims, 8 Drawing Sheets

HORIZONTAL DIRECTION
| -1 | 0 | 1 |
|---|---|---|
| -2 | 0 | 2 |
| -1 | 0 | 1 |
TARGET PIXEL
FIG. 3A
VERTICAL DIRECTION
| -1 | -2 | -1 |
|---|---|---|
| 0 | 0 | 0 |
| 1 | 2 | 1 |
FIG. 3B
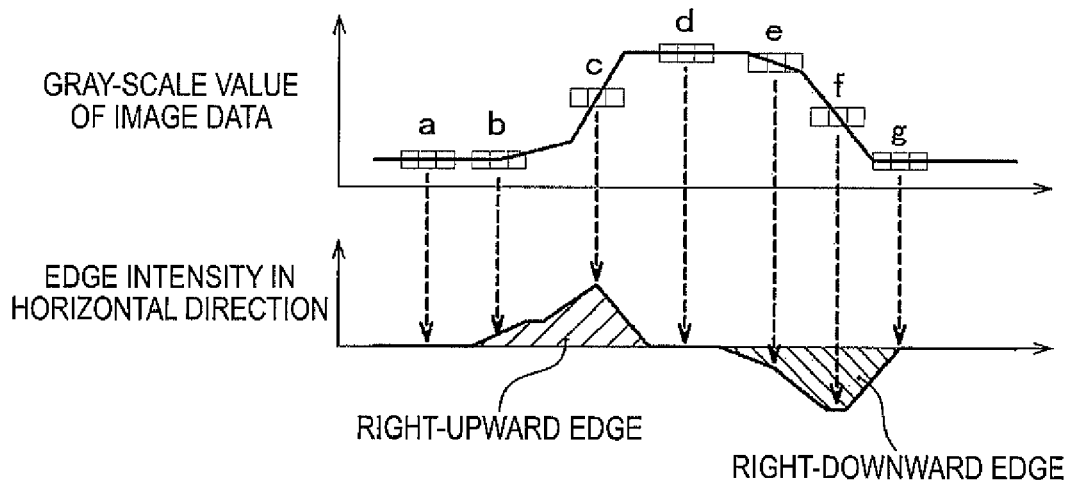
FIG. 3C
$$\begin{pmatrix} \text{EDGE INTENSITY OF} \\ \text{COMBINATION RESULT} \end{pmatrix} = \sqrt{\begin{pmatrix} \text{EDGE INTENSITY IN} \\ \text{HORIZONTAL DIRECTION} \end{pmatrix}^2 + \begin{pmatrix} \text{EDGE INTENSITY IN} \\ \text{VERTICAL DIRECTION} \end{pmatrix}^2}$$
FIG. 3D
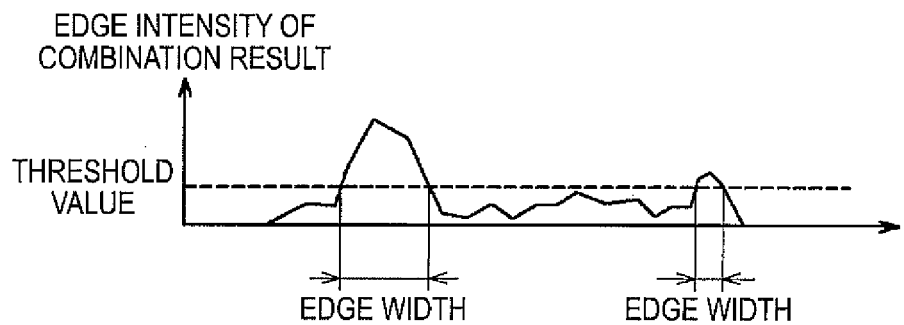
FIG. 3E

DIRECT-CURRENT COMPONENT OF DCT COEFFICIENT

ALTERNATING-CURRENT COMPONENT OF HORIZONTAL DCT COEFFICIENT

ALTERNATING-CURRENT COMPONENT OF VERTICAL DCT COEFFICIENT

| F00 | F01 | F02 | F03 | F04 | F05 | F06 | F07 |
|-----|-----|-----|-----|-----|-----|-----|-----|
| F10 | F11 | F12 | F13 | F14 | F15 | F16 | F17 |
| F20 | F21 | F22 | F23 | F24 | F25 | F26 | F27 |
| F30 | F31 | F32 | F33 | F34 | F35 | F36 | F37 |
| F40 | F41 | F42 | F43 | F44 | F45 | F46 | F47 |
| F50 | F51 | F52 | F53 | F54 | F55 | F56 | F57 |
| F60 | F61 | F62 | F63 | F64 | F65 | F66 | F67 |
| F70 | F71 | F72 | F73 | F74 | F75 | F76 | F77 |

$$G(u,v) = \frac{1}{2\pi\sigma^2} \exp\left(-\frac{u^2+v^2}{2\sigma^2}\right)$$

$$B(u,v) = \frac{1}{b} \delta(u \cdot \sin\Phi - v \cdot \cos\Phi) \cdot f\left(\frac{u^2+v^2}{b^2}\right)$$
$\delta(x)$: DELTA FUNCTION
$$f(x) = \begin{cases} 1 & \text{WITH } |x| < 1 \\ 0 & \text{OTHER THAN THAT} \end{cases}$$
FIG.9A
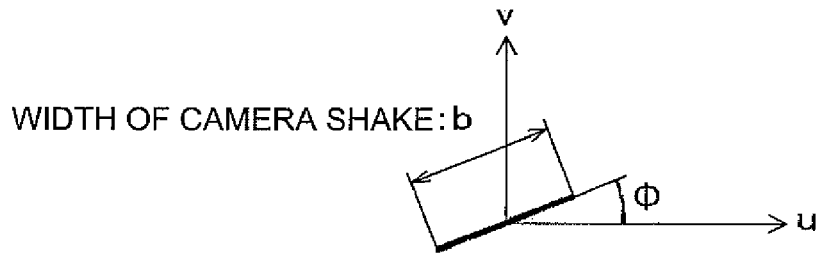
FIG.9B
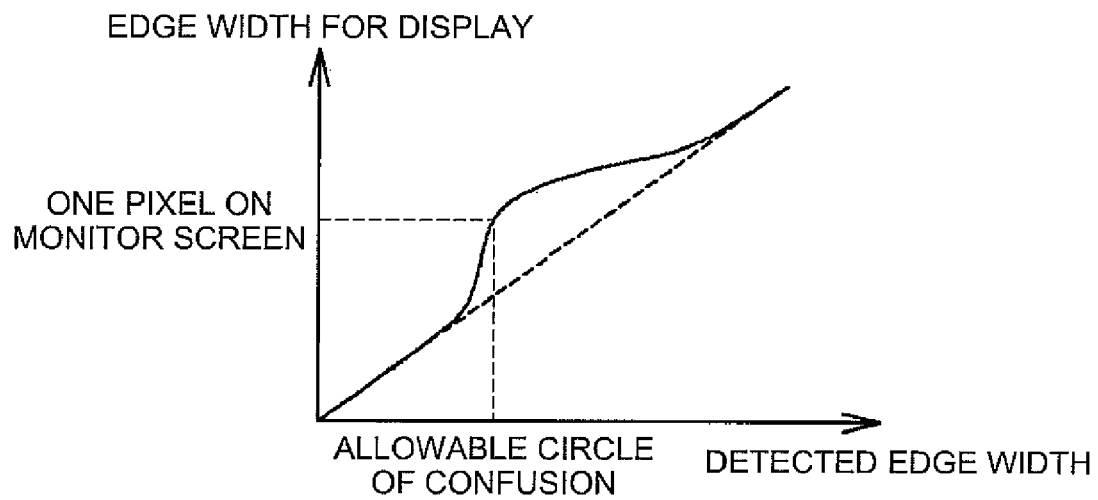
FIG.10

IMAGE DISPLAY APPARATUS AND METHOD, AND PROGRAM

BACKGROUND

1. Technical Field

The present invention relates to a technology for displaying, on a monitor screen, and image stored as digital data.

2. Related Art

With the recent progresses of electronic-related technologies exemplified by computer-related technologies, images are now often handled in the form of digital data. Images in the form of digital data can be stored in a large amount at low cost, and can be displayed at once on a monitor screen as the need arises for checking. Especially with a digital image-capturing device, e.g., digital camera, that can output any captured images in the form of digital data, the images can be immediately available for a user to check on a monitor screen, and he or she can capture the same images again as many as he or she wants. As such, the images in the form of digital data have become widely popular and have taken the place of silver halide photos.

The issue here is the small size of a monitor screen mounted to such a digital image-capturing device, e.g., digital camera, and to a digital image viewing device, e.g., photo viewer. Such a small monitor screen results in a difficulty in making a determination about the focus, i.e., in or out. In consideration thereof, Patent Document 1 (JP-A-2006-19874) describes the technology for enabling a decision making about the focus even on a monitor screen by enlarging a part of a captured image for display on the monitor screen.

With such a technology, however, there remains a problem of a difficulty for a user to determine, after capturing images by a digital camera or others, whether he or she wants to capture the same images again. This difficulty results from the fact that the images are often partially blurred on purpose at the time of image capturing, and with the resulting partially-blurred images, there needs to see the images as a whole including the object and understanding the composition thereof for a decision making as such. The issue here is that partially enlarging the images for display on the monitor screen causes another difficulty in grasping the images in their entirety, and there still remains the difficulty of such a decision making.

SUMMARY

An advantage of some aspects of the invention is to provide a technology that can help users, by displaying, on a monitor screen, images captured by a digital image-capturing device such as digital camera, to appropriately determine whether they want to capture the same images again or not.

A first aspect of the invention is directed to an image display apparatus that displays a digital image on a screen for check use. The image display apparatus includes: an image data storage unit that stores image data of the digital image; an edge detection unit that detects an edge included in the digital image through analysis of the image data; and an image display unit that displays, when the edge being a detection result has a width wider than a predetermined first threshold width, the digital image in a state that the width of the edge is visible on the check screen.

A second aspect of the invention is directed to an image display method that corresponds to the image display apparatus of the first aspect, and displays a digital image on a screen for check use. The image display method includes: detecting an edge included in the digital image through analysis of image data of the digital image that is stored in advance; and displaying, when the edge being a detection result has a width wider than a predetermined first threshold width, the digital image in a state that the width of the edge is visible on the check screen.

With the image display apparatus of the first aspect of the invention and the image display method of the second aspect thereof, image data of a digital image is first analyzed for edge detection, and when the edge width thereof is wider than a predetermined first threshold width, the digital image is then displayed on a check screen with the width of the edge being visible.

The check screen is often not large enough, and the resolution thereof is not often high enough. As a result, even if a digital image is blurred at the edges, a user has often no clue about the blurring of the image by only looking at the image displayed on the screen for check use. In consideration thereof, when any edge wider in width than the predetermined first threshold width is detected through analysis of image data, the edge is displayed visible on the check screen so that a user can easily acknowledge which part of the digital image is blurred, and by extension, the user can appropriately determine whether he or she wants to capture the same image again.

A third aspect of the invention is directed to an image display apparatus that displays a digital image on a screen for check use. The image display apparatus includes: an image data storage unit that stores image data of the digital image; an edge detection unit that detects an edge included in the digital image through analysis of the image data; and an image display unit that displays, when the edge being a detection result has a width narrower than a predetermined second threshold width, the digital image on the check screen in a state that the edge is enhanced in edge intensity being a gray-scale difference of the image data.

A fourth aspect of the invention is directed to an image display method that corresponds to the image display apparatus of the third aspect, and displays a digital image on a screen for check use. The image display method includes: detecting an edge included in the digital image through analysis of image data of the digital image that is stored in advance; and displaying, when the edge being a detection result has a width narrower than a predetermined second threshold width, the digital image on the check screen in a state that the edge is enhanced in edge intensity being a gray-scale difference of the image data.

With the image display apparatus of the third aspect of the invention and the image display method of the fourth aspect thereof, image data of a digital image is first analyzed for edge detection, and the digital image is then displayed on a check screen with edges enhanced in intensity if the edge width thereof is narrower than a predetermined second threshold width.

Thus, when a user acknowledges that the edges are displayed with an enhancement on the check screen, he or she understands that the image is out of focus, and is free from camera shake and object movement, for example. On the other hand, when the edges are displayed with no enhancement on the check screen specifically at an important part of the image, it is highly likely that the image is out of focus or suffering from camera shake, for example. This accordingly helps a user to appropriately determine whether he or she wants to capture the same image again.

In the image display apparatus of the first or third aspect, the resolution of image data may be used as a basis to determine the first or second threshold width.

In an image in focus, the higher resolution of image capturing leads to the larger number of pixels configuring the width of an edge. As such, when the resolution of image data is used as a basis to determine the first or second threshold width, the resulting threshold value of the width will be more appropriate, and by extension, a user can appropriately determine whether he or she wants to capture the same image again.

In the image display apparatus of the first or third aspect, alternatively, image data may be first subjected to resolution conversion in accordance with the resolution of a check screen, and the resulting data is stored as screen-display image data. The image data before resolution conversion is then subjected to edge detection, and when there is any edge wider in width than the first threshold width or any edge narrower in width than the second threshold width, the screen-display image data is subjected to image processing only at a portion of the detected edge. In this manner, the resulting digital image is displayed on the check screen with its edge width made visible or its edge enhanced.

As such, using the image data before resolution conversion as a basis for edge detection favorably leads to appropriate edge detection, and applying image processing to the resolution-converted image data favorably leads to a quick completion of image processing before display of the result on the check screen.

The invention can be implemented also by installing a program to a computer for realizing the image display method of the second or fourth aspect described above, and by making the computer to execute any predetermined functions. Accordingly, the invention can be implemented in the form of a program. That is, a fifth aspect of the invention is directed to a program that corresponds to the image display method of the second aspect described above, and implements a method of displaying a digital image on a screen for check use using a computer including an image data storage unit that stores image data of the digital image. The program allows the computer to execute: detecting an edge included in the digital image through analysis of the image data; and displaying, when the edge being a detection result has a width wider than a predetermined first threshold width, the digital image in a state that the width of the edge is visible on the check screen.

A sixth aspect of the invention is directed to a program that corresponds to the image display method of the fourth aspect described above, and implements a method of displaying a digital image on a screen for check use using a computer including an image data storage unit that stores image data of the digital image. The program allows the computer to execute: detecting an edge included in the digital image through analysis of the image data; and displaying, when the edge being a detection result has a width narrower than a predetermined second threshold width, the digital image on the check screen in a state that the edge is enhanced in edge intensity being a gray-scale difference of the image data.

With these functions of the programs implemented by installing the programs into a computer, users become able to determine, by looking at a captured image displayed on a monitor screen, whether they want to capture the same image again or not.

BRIEF DESCRIPTION OF THE DRAWINGS

The invention will be described with reference to the accompanying drawings, wherein like numbers reference like elements.

FIGS. 3A to 3E are illustrative diagrams showing how edge detection is made in an image using a Sobel filter.

FIGS. 9A and 9B are illustrative diagrams showing a general equation providing a two-dimensional filter for use to blur images.

FIG. 10 is an illustrative diagram conceptually showing edge blurring on the monitor screen in accordance with the edge width of a captured image in a second modification.

DESCRIPTION OF EXEMPLARY EMBODIMENT

In the below, for making clear the details of the aspects of the invention described above, embodiments of the invention is described in the following order.

Figure 1:
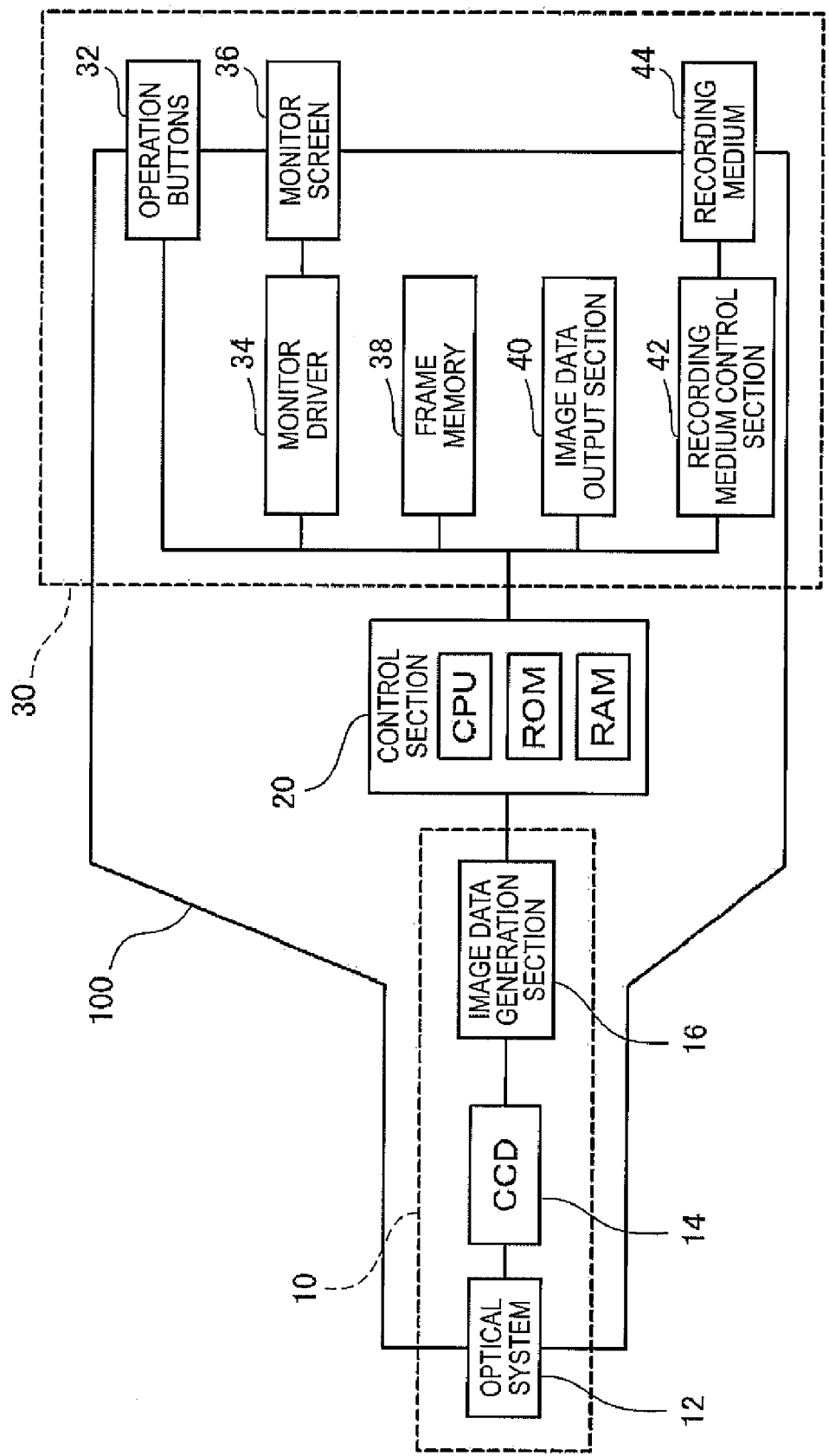
FIG. 1 is an illustrative diagram showing the configuration of a digital camera equipped with an image display apparatus of an embodiment of the invention.

A. Apparatus Configuration
B. Image Display Process
C. Modification
C-1. First Modification
C-2. Second Modification
C-3. Third Modification A. Apparatus Configuration FIG. 1 is an illustrative diagram showing the configuration of a digital camera 100 equipped with an image display apparatus of the embodiment. As shown in FIG. 1, the digital camera 100 of this embodiment is configured to mainly include an image-capturing section 10, a control section 20, and an operation section 30. The image-capturing section 10 generates image data by converting a light from an object into an electric signal. The control section 20 controls over the digital camera 100 in its entirety, and the operation section 30 is for a user to operate the digital camera 100. The image-capturing section 10 is configured to include mainly a CCD (Charge-Coupled Device) 14, an optical system 12, an image data generation section 16, and others. The CCD 14 is configured by a plurality of very small elements, each of which generates an electric charge depending on the intensity of light. The optical system 12 receives the light from the object, and directs the light onto the CCD 14 for image formation. The image data generation section 16 detects the level of the electric charge generated by the CCD 14, and generates image data of color components of R (Red), G (Green), and B (Blue). The control section 20 is configured by a CPU (Central Processing Unit), a ROM (Read-Only Memory), a RAM (Random Access Memory), and others, and runs various types of programs stored in the ROM, thereby controlling over the operation of the digital camera 100.

The operation section 30 is provided with various types of operation buttons 32, a monitor screen 36, a monitor driver 34, a frame memory 38, and others. The operation buttons 32 are those operated by a user of the digital camera 100. The monitor screen 36 is for check use of the composition of an image and image-capturing requirements. The monitor driver 34 directly drives the monitor screen 36 to make it display images and characters. The frame memory 38 stores images for display on the monitor screen 36. After the image data generation section 16 generates image data, various types of processing, e.g., resolution conversion, are applied thereto in accordance with the monitor screen 36, and the resulting data is written onto the frame memory 38. In response thereto, the image written onto the frame memory 38 is displayed on the monitor screen 36 so that the image is immediately available for the user of the digital camera 100 for checking on the monitor screen 36.

The operation section 30 is also provided with an image data output section 40, a recording medium control section 42, a recording medium 44, and others. When the user of the digital camera 100 decides to store an image after checking it on the monitor screen 36, he or she operates the operation buttons 32 so that a command of image storage is issued to the control section 20. In response thereto, the image data output section 40 converts the image data generated in the image data generation section 16, i.e., the image data in the format of RGB, into image data in the format of YCrCb. The YCrCb image data is configured by a component of intensity and a component of color difference. The image data output section 40 also applies JPEG (Joint Photographic Experts Group) compression to the image data, and outputs the result as image data for storage. Upon receiving the image data for storage from the image data output section 40, the recording medium control section 42 stores the image data by writing the data onto the recording medium 44.

Because the digital camera 100 handles images as digital data as such, a user can immediately check his or her captured images on the monitor screen 36, and when the user wants to capture the same images again, he or she can do so at once. However, the concern remains that the monitor screen 36 is limited in size due to the necessity for mounting on the digital camera 100, and the display resolution thereof is not as high as the printing resolution. As a result, the user may often not notice if the image on the monitor screen 36 is out of focus or suffering from camera shake, for example. Therefore, the user may miss the chance of image capturing when he or she is supposed to capture the same image again. In consideration thereof, with the digital camera 100 of this embodiment, image display is made on the monitor screen 36 in the following manner, thereby enabling a user to appropriately determine whether he or she wants to capture the same images again.

B. Image Display Process

Figure 2:
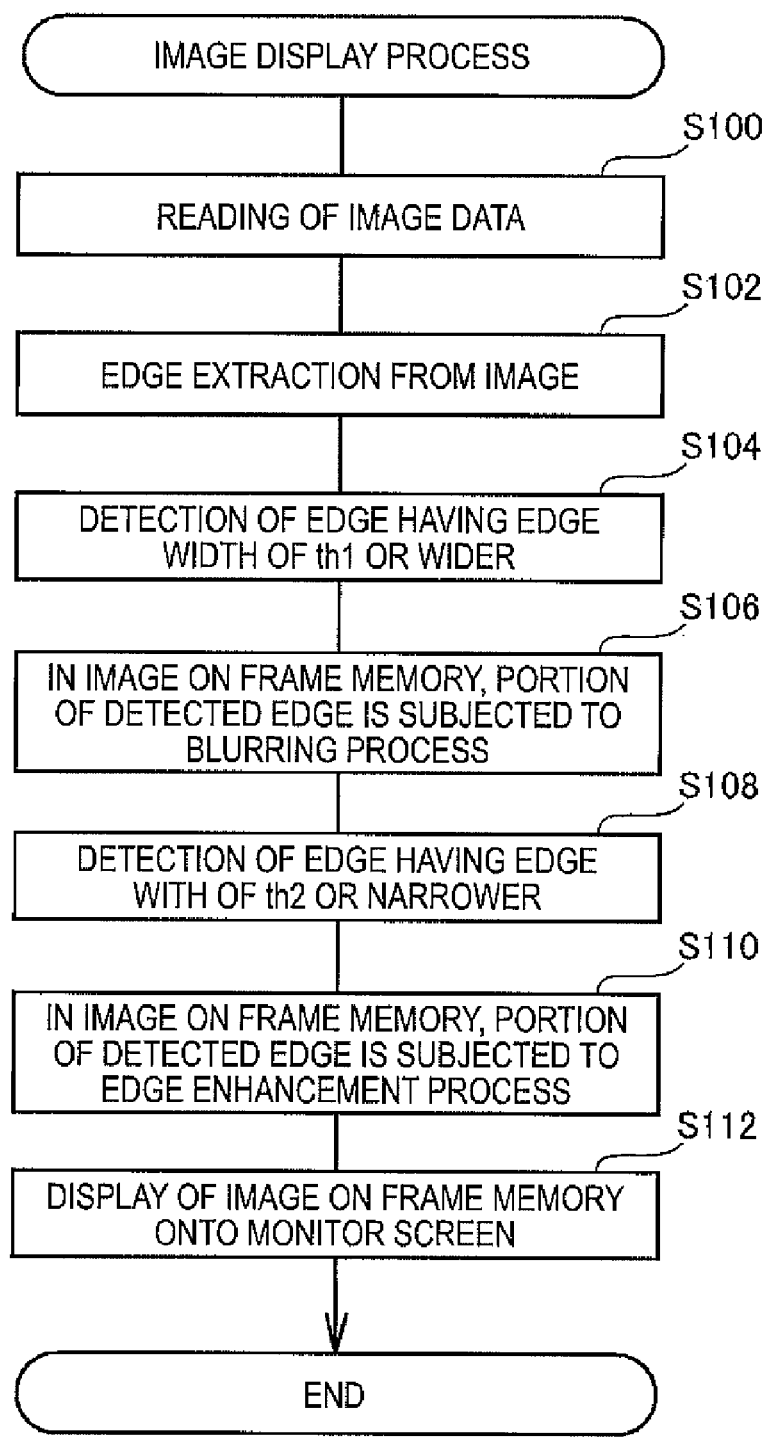
FIG. 2 is a flowchart of an image display process for the digital camera of the embodiment to display images on a monitor screen.

FIG. 2 is a flowchart of an image display process for the digital camera 100 of this embodiment to display images on the monitor screen 36. This process is to be executed by a CPU equipped in the control section 20.

In the image display process of FIG. 2, first of all, image data generated by the image data generation section 16 is read (step S100), and a process is executed to extract any edge found in the image (step S102). Such edge extraction can be performed by various types of methods, and most simply, a two-dimensional filter such as Sobel filter is applied to the image data.

FIGS. 3A to 3E are illustrative diagrams showing edge detection in an image using a Sobel filter. FIG. 3A shows an exemplary Sobel filter for edge detection in the horizontal direction, and FIG. 3B shows an exemplary Sobel filter for edge detection in the vertical direction. As shown in FIGS. 3A and 3B, the Sobel filters are each set with predetermined weight coefficients to pixels around a target pixel. For applying such a Sobel filter to image data, the image data of pixels around the target pixel is multiplied by each corresponding weight coefficients, and the resulting values are added together for setting as a value of the target pixel. FIG. 3C shows an example in which a Sobel filter is applied to image data for edge detection in the horizontal direction. In the drawing, the rectangles drawn by thin lines are each schematically denoting the Sobel filter. When the Sober filter is located at the position of "a", i.e. at the position where the gray-scale value shows no change, the weight of the pixels on the right side from the center of the Sober filter is cancelled out by the weight of the pixels on the left side therefrom, and thus the output value of the Sobel filter, i.e., intensity of edge, will be almost "0". On the other hand, when the right portion of the Sobel filter lies on an edge as at the position of "b", the intensity of edge takes a positive value. When the Sobel filter lies entirely on the edge as at the position of "c", the intensity of edge is increased. If an edge is right-downward as at the position of "e", the intensity of edge takes a negative value. As such, by applying the Sobel filter to the image data for edge detection in the horizontal direction, the intensity of edge can be detected in the horizontal direction. Similarly, by applying the Sobel filter to the image data for edge detection in the vertical direction, the intensity of edge can be detected in the vertical direction. Thereafter, using the calculation equation in FIG. 3D, the intensity of edge as a result of edge detection in the horizontal direction and that in the vertical direction are combined together. FIG. 3E exemplarily shows the resulting intensity of edge. The intensity of edge being the combining result is then compared with a predetermined threshold value, and when the intensity of edge is detected as exceeding the threshold value in a row, the number of pixels is the width of the edge. In step S102 of FIG. 2, edge extraction is performed as such from an image.

Figures 4, 5A, 5B:
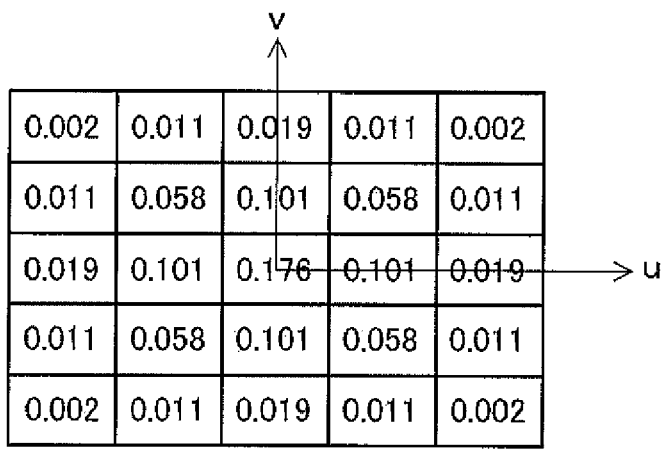
FIG. 4 is an illustrative diagram showing image data of a block stored in the format of JPEG.
FIGS. 5A and 5B are illustrative diagrams showing an exemplary Gaussian filter for use to blur images for checking of the width of edges.

For edge extraction from an image, using the Sobel filter as such is surely not the only option, and any other methods will also do. For example, utilizing the fact that image data is converted into the JPEG format before storage thereof, edge extraction can be performed with relative ease as below. FIG. 4 is an illustrative diagram showing image data of a block stored in the format of JPEG. In the JPEG image data, pixels are not each carrying a gray-scale value of image data but a DCT (Discrete Cosine Transform) coefficient. The DCT coefficient is a value corresponding to the power of the frequency component included in the image of a block, and because an image is two-dimensional, the frequency components exist in the vertical and horizontal directions. For every combination of frequency components in the vertical and horizontal directions, i.e., two-dimensionally, a DCT coefficient exists. With JPEG, instead of representing image data by a gray-scale value of each of pixels, an image is partitioned into blocks of a predetermined size, i.e., normally 8×8 blocks, and the resulting block images are each represented by two-dimensional power of the frequency components, i.e., OCT coefficient. For information, the DCT coefficients of high-frequency components have little effect on an image, and the image quality shows almost no deterioration if with no high-frequency component. As such, the image can be compressed in data size with no high-frequency component. As shown in FIG. 4, by using horizontal DCT coefficients, any change in the horizontal direction observed in the image can be reproduced, and by using vertical DCT coefficients, any change in the vertical direction observed in the image can be reproduced using the same principle as shown in FIGS. 3C and 3D. As such, after image data is converted into the JPEG format, horizontal and vertical DCT coefficients are read for analysis so that the edge width can be known both in the horizontal and vertical directions. The resulting edge widths can be combined together for use as an extraction result.

After edge extraction as such from the image (step S102 of FIG. 2), from the extraction result, a search is made for any edge with a width wider than a predetermined threshold value th1 (step S104). The threshold value th1 may be fixed in advance, or may be changed in accordance with the resolution of an image captured by the digital camera 100. That is, considering the fact that the higher resolution at the time of image capturing increases the number of pixels configuring the edge width in an image in focus, the threshold value th1 may be of a value being relatively large. However, even with a higher resolution, it is considered desirable not to increase the threshold value that much because an image of a higher resolution will be highly likely to be enlarged for printing. Alternatively, the threshold value th1 may be changed in accordance with the setting of a compression ratio at the time of image storage by the digital camera 100. That is, with a higher compression ratio at the time of image storage, the threshold value th1 may be set larger.

As a result of analysis of image data, when any edge is found with a width wider than the threshold value th1, the portion including the edge is subjected to a blurring process in the image stored on the frame memory 38 (step S106). The blurring process can be performed by applying a so-called averaging filter, i.e., two-dimensional filter using an average value of pixels therearound as a gray-scale value of its own pixel(s), to an image. Alternatively, a two-dimensional filter called Gaussian filter can blur an image in a more natural manner. Such a Gaussian filter is not restrictive in type for use as long as it can blur an image to a level allowing a user to at least acknowledge the edge width on the monitor screen 36. In this embodiment, such a Gaussian filter as shown in FIG. 5A is used. Also, FIG. 5B shows a general equation of the Gaussian filter, which easily leads to the Gaussian filter under the conditions that the value of σ is set with the number of pixels for blurring, and the filter size, i.e., the number of pixels in the vertical and horizontal directions, is set to be about twice as large as the value of σ.

Figure 6A:
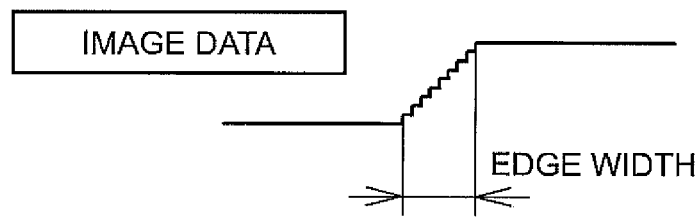
FIGS. 6A to 6C are illustrative diagrams conceptually showing edge blurring for checking of the width of the edges.
Figure 6B:
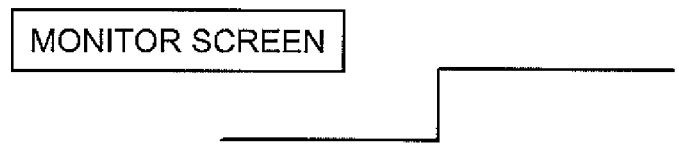
Figure 6C:
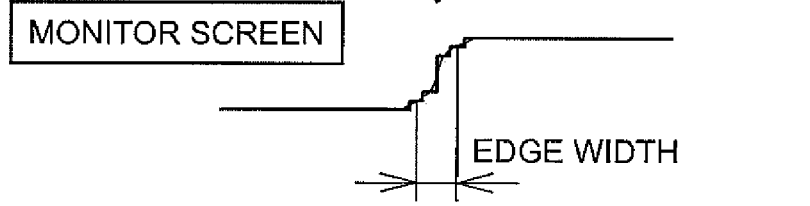

FIGS. 6A to 6C are illustrative diagrams conceptually showing how to blur an image on the frame memory 38 to allow a user to acknowledge the edge width on the monitor screen 36. FIG. 6A shows an edge in image data. As such, even when the image data generated by the image data generation section 16 includes any edge wider in width than the threshold value th1, i.e., corresponding to a case where the image is being out of focus, the image is reduced in size on the monitor screen 36, and the resolution of the image is changed in accordance with the monitor screen. As a result, as shown in FIG. 6B, the edge width becomes flattened, and thus the user has no clue whether the image is in or out of focus. For betterment, by applying a two-dimensional filter such as Gaussian filter to the image of FIG. 6B, the image can be blurred to a level allowing the user to acknowledge the edge width as shown in FIG. 6C. In step S106 in the image display process of FIG. 2, in such a manner, a two-dimensional filter such as Gaussian filter is applied to the image on the frame memory 38, and the process is executed to blur the image to a level allowing a user to acknowledge the edge width on the monitor screen 36.

After the process is completed as such with respect to any edge with a width wider than the threshold value th1, another search is made this time for any edge with a width narrower than a threshold value th2 (th2<th1) (step S108). Similarly to the threshold value th1, the threshold value th2 may be fixed in advance, or may be changed in accordance with the resolution of an image captured by the digital camera 100, or may be changed in accordance with the setting of a compression ratio at the time of image storage by the digital camera 100.

As a result of detection as such, when any edge is found with a width narrower than the threshold value th2, the portion including the edge is subjected to a process of edge enhancement in the image stored on the frame memory 38 (step S110).

Figure 7A:
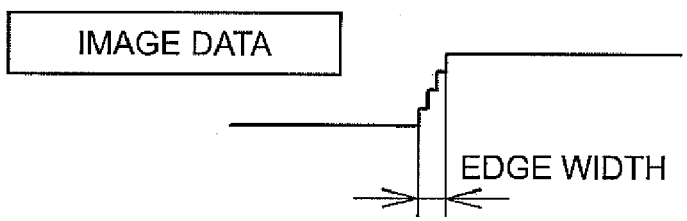
FIGS. 7A to 7C are illustrative diagrams conceptually showing edge enhancement.
Figure 7B:
Figure 7C:
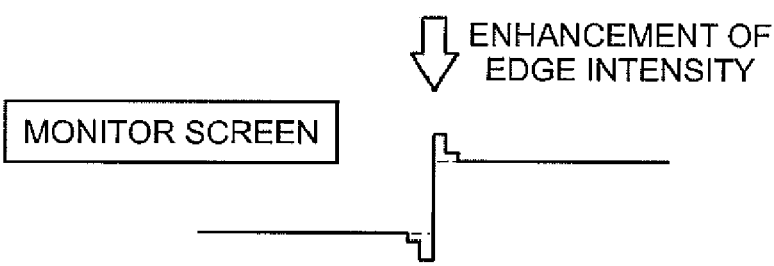

FIGS. 7A to 7C are illustrative diagrams conceptually showing edge enhancement. FIG. 7A shows an edge in image data. As shown in the drawing, when the width of the edge found in the image data is narrower than the threshold value th2, i.e., corresponding to a case where the image is being in focus, on the monitor screen 36, the image is reduced in size, and the resolution of the image is changed. As a result, as shown in FIG. 7B, the edge width is hardly visible on the screen. However, if with any edge wider in width in the image data, i.e., the image is being out of focus, the edge width is also hardly visible on the monitor screen 36, and thus the user has no clue whether the image is in or out of focus on the monitor screen 36. For betterment, when the edge width is narrower than the threshold value th2, i.e., the image is being in focus, as shown in FIG. 7C, a process of edge enhancement is performed by applying a brightness correction, i.e., brightness is increased on the bright side of an edge and decreased on the dark side of the edge. Such a correction can be made also by applying a two-dimensional filter for edge enhancement use to images. In step S110 of FIG. 2, the process of edge enhancement is performed with respect to the images on the frame memory 38 as such.

After the process is completed as such for any edge with a width narrower than the threshold value th2, the image on the frame memory 38 is displayed on the monitor screen 36 (step S112), and this is the end of the image display process of FIG. 2.

Figure 8A:
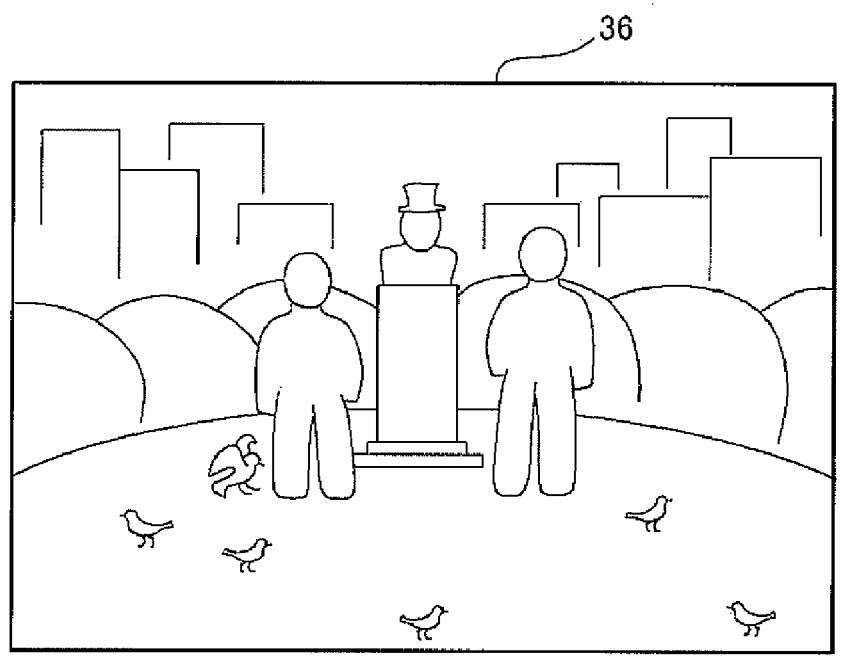
FIGS. 8A and 8B are each an illustrative diagram showing an exemplary image displayed on a monitor screen.
Figure 8B:
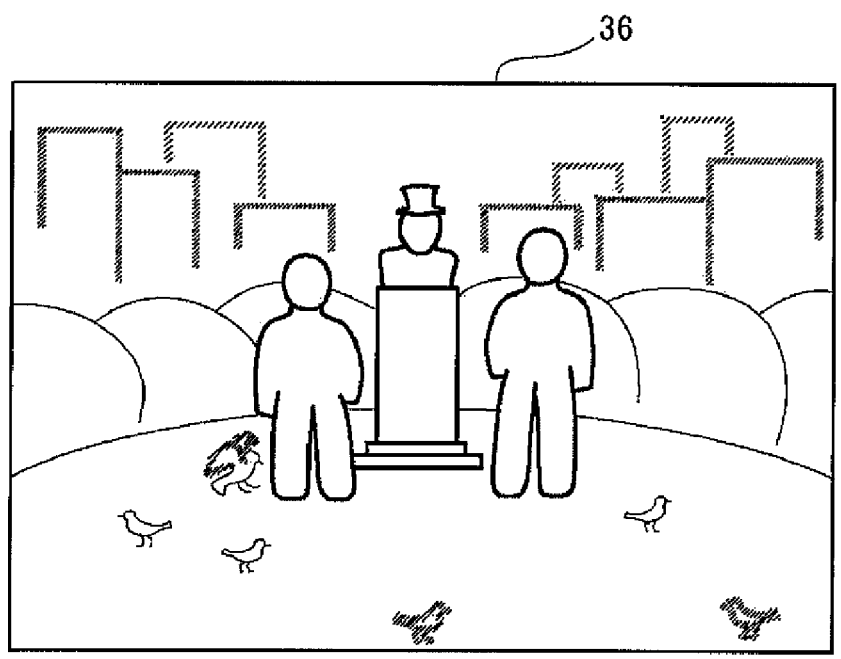

FIGS. 8A and 8B are illustrative diagrams showing exemplary images displayed on the monitor screen 36. FIG. 8A shows an image before the image display process described above, and FIG. 5B shows an image through with the image display process. As is evident from FIG. 8A, the monitor screen 36 offers, with a sufficient level, a user the composition and the entire look of a captured image, but the monitor screen 36 is limited in size and the display resolution thereof is not as high as the printing resolution. As a result, the user may often not know if the image on the screen is in or out of focus or suffering from camera shake or object movement, for example.

On the other hand, with the digital camera 100 of this embodiment, data of a captured image is first analyzed, and for any portion with the edge width being wider than a predetermined threshold value th1, the edge is blurred for display on the monitor screen 36, and for any portion with the edge width being narrower than a predetermined threshold value th2, the edge is enhanced for display on the monitor screen 36. In FIG. 8B, for example, two pigeons positioned at the most forward and far-off buildings are blurred at the edges, and the edge width is visible. Two people at the center and a statue between the two people are displayed with their edges being enhanced. Moreover, as to a pigeon flapping its wings to land just in front of the people, only the portion of its wings is blurred at the edges on display. This helps a user to immediately know that the images of the two pigeons at the most forward and the images of the far-off buildings are out of focus but the images of the people at the center and the image of the statue are in focus. As to the image of the pigeon with the flapping wings, the portion of its wings is suffering from object movement. Such checking, e.g., whether the image is in or out of focus on a portion basis, or whether there is any portion suffering from object movement or camera shake, can be made on the monitor screen 36 together with the checking of the composition of the image and the entire look thereof, thereby enabling a user to determine, immediately after capturing the image, whether he or she wants to capture the same image again at once with appropriateness.

C. Modification

The image display process of the embodiment described above has various types of modifications. These modifications are briefly described below.

C-1. First Modification

Described in the above embodiment is the case that, if an image has any portion whose edge width is wider than a threshold value th1, no matter what is the reason of the width, e.g., being out of focus or due to camera shake or object movement, the image is blurred at the edges for display on the monitor display 36. Alternatively, when the analysis result of image data generated by the image data generation section 16 tells that the image is suffering from camera shake, instead of blurring the image by applying a Gaussian filter to the image on the frame memory 38, a filter for causing camera shake to the image may be used. FIG. 9A is an illustrative diagram showing a general equation providing a two-dimensional filter for causing camera shake to an image. For causing camera shake to an image with a width of camera shake b in the direction of angle Φ, by using the two-dimensional filter generated by the general equation in FIG. 9A, the resulting image can be displayed with a result of some camera shake.

C-2. Modification

Described in the above embodiment is the case that, when the edge width is wider than a threshold width th1, the image on the frame memory 38 is always applied with a filter so that the image is blurred at the edges. Alternatively, when the edge width is sufficiently wide in a captured image, i.e., image data generated by the image data generation section 16, with no such filter application to the image on the frame memory 38, the edge width is visible on the monitor screen 36, and a user can know that the image is out of focus. On the other hand, when the edge width of a captured image is narrower than the size of an allowable circle of confusion, the image looks as if being in focus even it is printed, and thus there is no need to blur the image at the edges for display on the monitor screen 36. The allowable circle of confusion herein is the one representing a circular image formed on the CCD 14 by a light from the point-light source, which is presumed as being disposed at the position of an object, and is of a size like a dot for human eyes with a difficulty telling which is which. The allowable circle of confusion herein is of the largest possible size. Accordingly, when the edge width of a captured image is of almost the same as that of the allowable circle of confusion, the corresponding portion of the image may be so blurred that the edge width looks like a pixel or so on the monitor screen 36, and for any other edges narrower in width, the corresponding portion of the image may be displayed on the monitor image 36 with no image blurring. When the edge of a captured image is sufficiently wide in width, and when the edge width is visible with no image blurring on the monitor screen 36, the image may be displayed on the monitor screen 36 with no more image blurring. FIG. 10 conceptually shows blurring of an edge width on the monitor screen 36 in accordance with the edge width of a captured image in such a second modification.

By blurring the image on the monitor screen 36 as such, when the image is slightly out of focus to a degree of an allowable circle of confusion, the edge width on display is of a pixel being the minimum edge width visible on the monitor screen 36. As the degree of image blurring is increased in the captured image, the image can be displayed with blurred edges on the monitor screen 36. As such, a user can check also the degree of the captured image blurring on the monitor screen 36.

C-3. Third Modification

Figure 11:
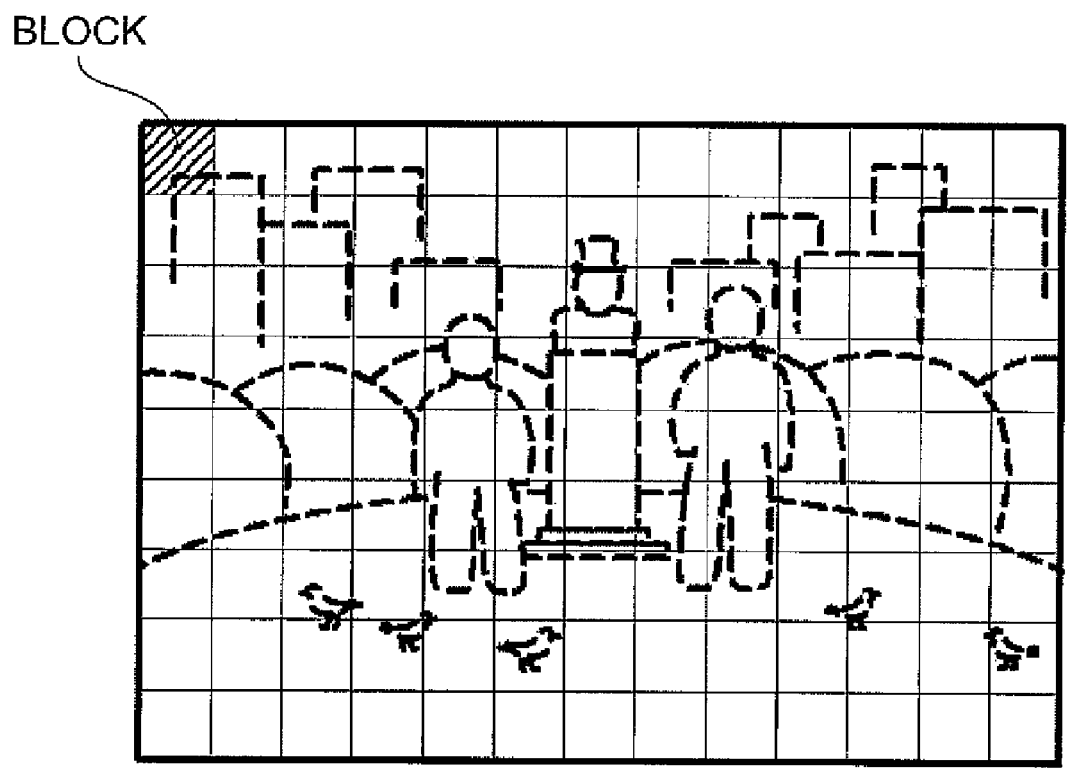
FIG. 11 is an illustrative diagram conceptually showing image partition into a plurality of blocks for display in a third modification.

Alternatively, for image display on the monitor screen 36, the image data generated by the image data generation section 16 may be partitioned into a plurality of blocks, and edge width detection may be made on a block basis. FIG. 11 shows an exemplary case of partitioning an image into a plurality of blocks in a third modification. With detection of edge width as such by analyzing the block images being the partitioning results, a determination can be made whether the image is in or out of focus on a block basis. For any block image being out of focus, the image is blurred for display on the monitor screen 36, and for any block image being in focus, the image is displayed with edges enhanced on the monitor screen 36.

Generally, any portion in the vicinity of a portion being in focus is similarly in focus, and any portion in the vicinity of a portion being out of focus is similarly out of focus. As such, the processing on a block basis causes no practical problem. What is good, a determination is made for every block image to see whether it is in focus or not, and in any portion determined as being in focus, the edge is enhanced for display, and any portion determined as being out of focus, the image is blurred for display. This accordingly simplifies the process and increase the processing speed.

While the image display apparatus of this embodiment has been described, the foregoing description is in all aspects illustrative and not restrictive. It is understood that numerous other modifications and variations can be devised without departing from the scope of the invention.

Exemplified in this embodiment is the case that an image is displayed on a monitor screen mounted on a digital camera. This is surely not restrictive, and the embodiment of the invention can be applied to any type of image display apparatus that is capable of image display, e.g., display of a desktop personal computer (PC) or that of a notebook PC, a photo viewer, and a display of a camera-equipped mobile phone.

Also exemplified in this embodiment is the case that any edge with an edge width being wider than a threshold value th1 is subjected to the blurring process, and any edge with an edge width being narrower than a threshold value th2 is subjected to the edge enhancement process. This is surely not restrictive, and either of the processes may be only executed.

The entire disclosure of Japanese Patent Application No. 2007-185311, filed Jul. 17, 2007 is expressly incorporated by reference herein.

What is claimed is:

1. An image display apparatus that displays a digital image on a screen for check use, comprising:
    an image data storage unit that stores image data of the digital image;
    an edge detection unit that detects an edge included in the digital image through analysis of the image data; and
    an image display unit that displays, when the edge being a detection result has a width wider than a predetermined first threshold width, the digital image in a state that the width of the edge is visible on the check screen,
    wherein the image display unit displays, when the edge being a detection result has a width narrower than a predetermined second threshold width, the digital image on the check screen in a state that the edge is enhanced in edge intensity being a gray-scale difference of the image data.

2. The image display apparatus according to claim 1, further comprising:
   a resolution acquisition unit that acquires a resolution of the image data; and
   a threshold width determination unit that determines the first threshold width in accordance with the resolution being an acquisition result.

3. The image display apparatus according to claim 1, further comprising
   a screen-display image data storage unit that applies resolution conversion to the image data in accordance with a resolution of the check screen, and stores a result of the resolution conversion as image data for screen display use, wherein
   the image display unit changes a display state of the edge by applying image processing to the image data for screen display use, and displays a result of the image processing on the check screen.

4. An image display apparatus according to claim 1, wherein the detected edge having a width wider than a predetermined first threshold width is displayed after the detected edge is blurred.

5. An image display method of displaying a digital image on a screen for check use, comprising:
   detecting an edge included in the digital image through analysis of image data of the digital image that is stored in advance;
   displaying, when the edge being a detection result has a width wider than a predetermined first threshold width, the digital image in a state that the width of the edge is visible on the check screen; and
   displaying, when the edge being a detection result has a width narrower than a predetermined second threshold width, the digital image in a state that the edge is enhanced in edge intensity being a gray-scale difference of the image data.

6. An image display method of displaying a digital image on a screen for check use, comprising:
   detecting an edge included in the digital image through analysis of image data of the digital image that is stored in advance; and
   displaying, when the edge being a detection result has a width narrower than a predetermined second threshold width, the digital image on the check screen in a state that the edge is enhanced in edge intensity being a gray-scale difference of the image data.

* * * * *